United States Patent [19]
Meloche et al.

[11] Patent Number: 5,495,871
[45] Date of Patent: Mar. 5, 1996

[54] MULTIPLE VALVE MANIFOLD WITH PLURAL POWER SUPPLIES

[75] Inventors: Joseph L. Meloche, Bryan, Ohio; Jeffery W. Smith, Angola, Ind.

[73] Assignee: The Aro Corporation, Bryan, Ohio

[21] Appl. No.: 415,561

[22] Filed: Apr. 3, 1995

[51] Int. Cl.$^6$ .................................................. F16K 11/10
[52] U.S. Cl. ............................................. 137/884; 137/560
[58] Field of Search ...................................... 137/560, 884

[56] References Cited

U.S. PATENT DOCUMENTS

| | | | |
|---|---|---|---|
| 3,513,876 | 5/1970 | Tarbox | 137/596 |
| 4,726,393 | 2/1988 | Herner | 137/269 |
| 4,815,496 | 3/1989 | Nishitani et al. | 137/560 X |
| 4,889,164 | 12/1989 | Hozumi et al. | 137/625.64 |
| 4,896,700 | 1/1990 | Stoll | 137/884 |
| 5,025,834 | 6/1991 | Stoll | 137/560 |
| 5,048,569 | 9/1991 | Stoll | 137/625.64 |
| 5,184,648 | 2/1993 | Walter et al. | 137/560 X |
| 5,234,033 | 8/1993 | Stoll et al. | 137/884 |
| 5,348,047 | 9/1994 | Stoll et al. | 137/554 |
| 5,351,599 | 10/1994 | Stoll | 91/1 |

*Primary Examiner*—John C. Fox
*Attorney, Agent, or Firm*—George C. Kurtossy; Walter C. Vliet

[57] ABSTRACT

A modular valve system in which individual valves are housed in individual, discrete, pluggable units so that they can easily be assembled. Each unit housing a valve also houses the necessary electrical circuitry both to control and actuate the valves. The electrical circuit necessary to actuate a valve has its own power supply and is separate from the circuit that generates the control signal which also has its own power supply.

5 Claims, 2 Drawing Sheets

MULTIPLE VALVE MANIFOLD WITH PLURAL POWER SUPPLIES

FIELD OF THE INVENTION

This invention relates to a modular, multiple valve system comprised of individual valves being housed in discrete and pluggable valve units in which individual valves in the system are actuated to open or close in response to control signals emanating from the control board. More particularly, the invention relates to a system in which the control signals are furnished to each valve unit by an electrical circuit having its own power supply circuit, separated from the power supply circuit which provides the actuation signals to open or close each valve.

BACKGROUND OF THE INVENTION

The prior art is replete with systems in which multiple valves are assembled by way of being housed in individual, modular, units which are adapted to be plugged together so that a system can be created. Typically, each individual valve is housed in a valve housing unit in which both hydraulic and electrical passages are formed to selectively provide the electrical signals to actuate—typically through a solenoid—a particular one or more of the several valves. The necessary electrical interconnections to connect together a plurality of the individual valve housings has typically been accomplished by individually hand wiring each valve housing to its adjacent cousins so that a common control system can be utilized. Such hand wiring is difficult and time consuming and results in increased manufacturing costs.

More recent modular valve systems eliminate the hand wiring by providing each pluggable valve housing unit with pre-printed circuit boards so as to eliminate the tedious and inefficient hand wiring process to thereby create a more modular system. However, such systems are compromised electrically because both the control and the actuating signals required for each valve are furnished in a common electrical circuit having one power supply massive enough to supply the power, typically 24 volts, required to drive a solenoid which opens or closes a particular valve in the system. Such a massive power supply is of course completely unnecessary for driving the circuits which produce the control signals which, themselves, really need no more power than required for typical control signals which can be generated with power supplies as low as 3 to 5 volts, for example, those control signals generated by a small computer.

When both the control and actuation signals are provided by a single, common power supply, in a common circuit with a common ground, undesirable transient and crosstalk effects can arise to interact and create electronic noise effecting either the control signals or the valve actuation signals and result in undesirable interference between.

Accordingly, it a primary object of this invention to eliminate the above-noted problems in the prior art and to provide a system which eliminates both the expensive and time consuming manual hand wiring as well as the undesirable cross talk between the control and actuation signals.

SUMMARY OF THE INVENTION

In accordance with the invention, each one of the multiple valves in a system is housed in a generally identical, modular housing unit which can be plugged in (or unplugged) as a system changes in size and scope. In each modular housing unit there is contained a driver board and amplifier, connected, through the modular pluggable units, in a circuit which includes a power supply having the necessary power (i.e. current delivery capability) to electromagnetically (i.e. typically through a solenoid) actuate each valve in the modular valve assembly. This high current capacity power supply has its own ground and is separate from, and electrically independent of, a second power supply which supplies the power necessary to generate the control signals which trigger each driver board to provide the actuation signal necessary to drive the solenoids. The second power supply is furnished to all the control circuit boards also contained in each valve housing unit and this circuit has its own ground, electrically separate from, and independent of, the power supply circuit which provides the valve actuating signals. Typically, the second power supply circuit is both of lower voltage and current capability than the power supply required to actually drive the solenoids with an actuating signal.

Generating the control signals in a power supply circuit having both a lower voltage and current capability than the one required to actuate the valves allows the control circuitry to carry low level, low current, signals, such as might, for example, be generated by a small computer. This allows sophisticated system control in which the control signals are provided by a common bus to selectively actuate any desired one or more of the valves in accordance with a computer program.

The foregoing features, objects, advantages, and other aspects of the invention are described in greater detail in the following more particular description of a preferred embodiment of the invention, as illustrated in the accompanying drawings.

DETAILED DESCRIPTION

Figure 1:
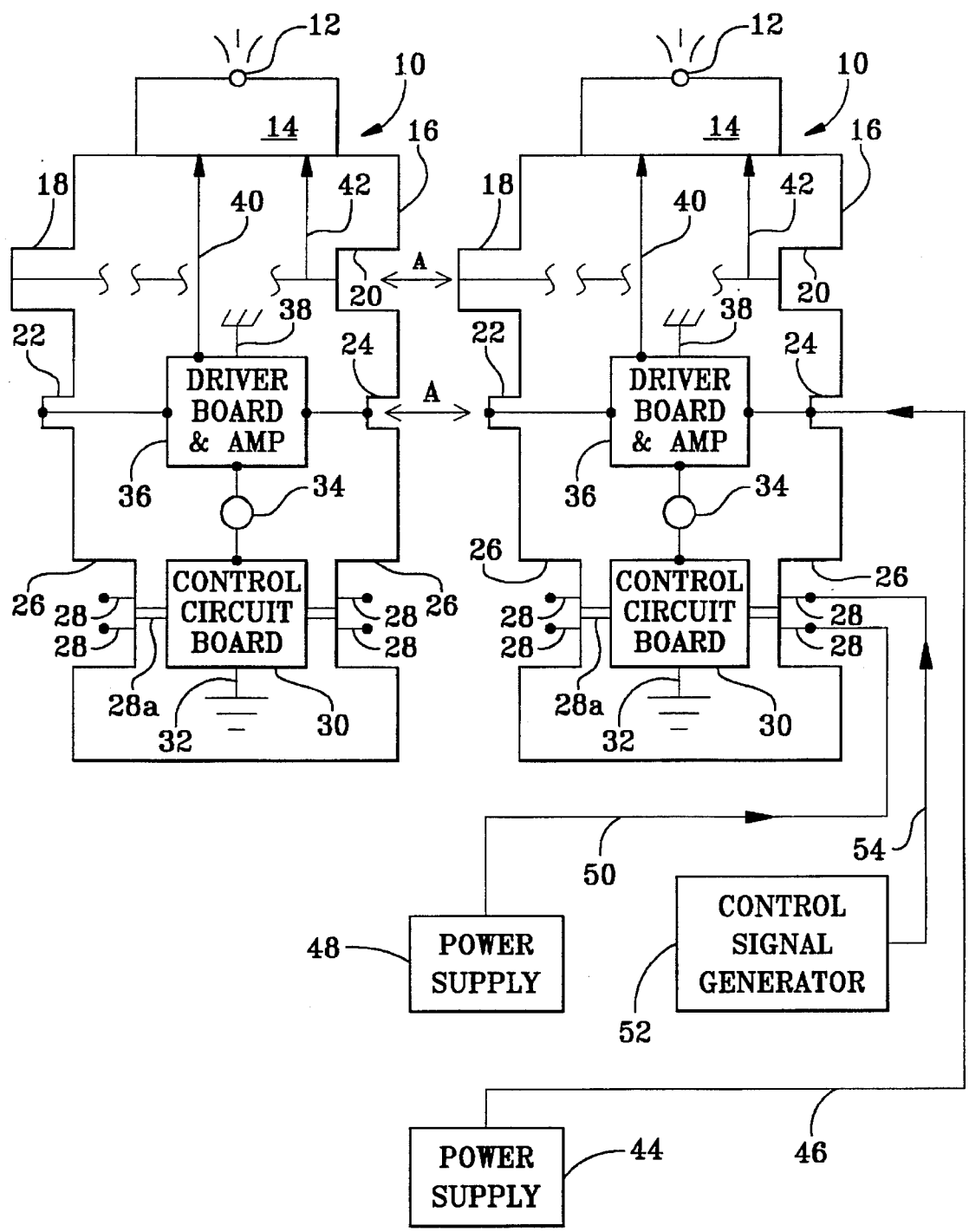
FIG. 1 is a schematic, functional, block-diagram of a plurality of modular valve blocks.

Referring now to FIG. 1, there is shown a modular valve housing unit 10 which includes a valve orifice 12, the opening and closing of which is controlled by an electromagnetic device 14, e.g. a solenoid. Valve unit 10 includes a housing 16 in which there are defined both a male plug 18 and a female receptacle 20 adapted to plug into, or receive, a corresponding part in a second valve unit 10. Typically, these projections and receptacles carry fluids, such as air, or hydraulic substances, into passageways, (not shown) cast or machined into the interior of housing 16.

Each housing 16 further includes both a male plug 22 and a female receptacle 24 to establish electrical connection between the correspond parts of an identical valve unit 10. Housing 16 further defines female receptacles 26, each of which is provided with a plurality of male plug connectors 28 to provide a second electrical connection as will be further described below. When two identical valve units 10 are plugged together, in the direction of the arrow A, the male prongs 28 can be linked by a female connector jumper (not shown). Within each valve housing 16, there is a control circuit board 30 having its own, independent, electrical ground 32 and the control circuit board 30 is connected to the plurality of connectors 28 by a bus 28a. Each control circuit board 30 provides signals, by way of an isolator circuit, such as an optoisolator, 34 to a driver board and amp circuit 36, having its own, independent, electrical ground 38. When a driver board and amp circuit is triggered by a control circuit board 30, it provides an actuating signal over line 40 so as to actuate the electromagnetic device 14 to admit hydraulic fluid from a line 42 into the valve orifice 12.

It is clear than any desired number of valve units 10 may be plugged together to thereby create a multiple valve system.

Each driver board and amplifier 36 is powered by a power supply 44 which provides each of the driver boards 36 with power over an electrical connection 46. It is noted that power supply 44 has sufficient voltage and current delivery capability to actuate each electromagnetic device 14 in each valve unit 10. As noted before, the circuit including power supply 44 and each one of the driver boards, 36 has its own independent electrical ground 38 which is physically and electrically separate from the electrical ground 32 of the control circuit boards 30. Control circuit boards 30 are supplied by a second power supply 48 which supplies a much lower voltage and lower current (than does power supply 44) to each of the control circuit boards 30.

In addition to being provided with power from power supply 48, each control circuit board 30, which is preferably a printed circuit board have multiple electrical connections etched thereon by known means, is also supplied with control signals from a control signal generator 52 which communicates with each one of the control circuit boards 30 through a control signal bus 54. When multiple valve units 10 are plugged together in the above-described manner, the control circuit boards 30 will carry control signals from control signal generator 52 (which may be a personal computer) to each one of the control circuit boards 30 by way of the circuits printed thereon to provide the control signals to trigger driver boards 36. It is noted that the isolation devices 34, which are preferably of the optoisolator type, function to electrically separate the two power supply circuits, provided by power supply 44 and 48, one from the other. The isolator 34 can of course also be constituted by a common relay.

Figure 2:
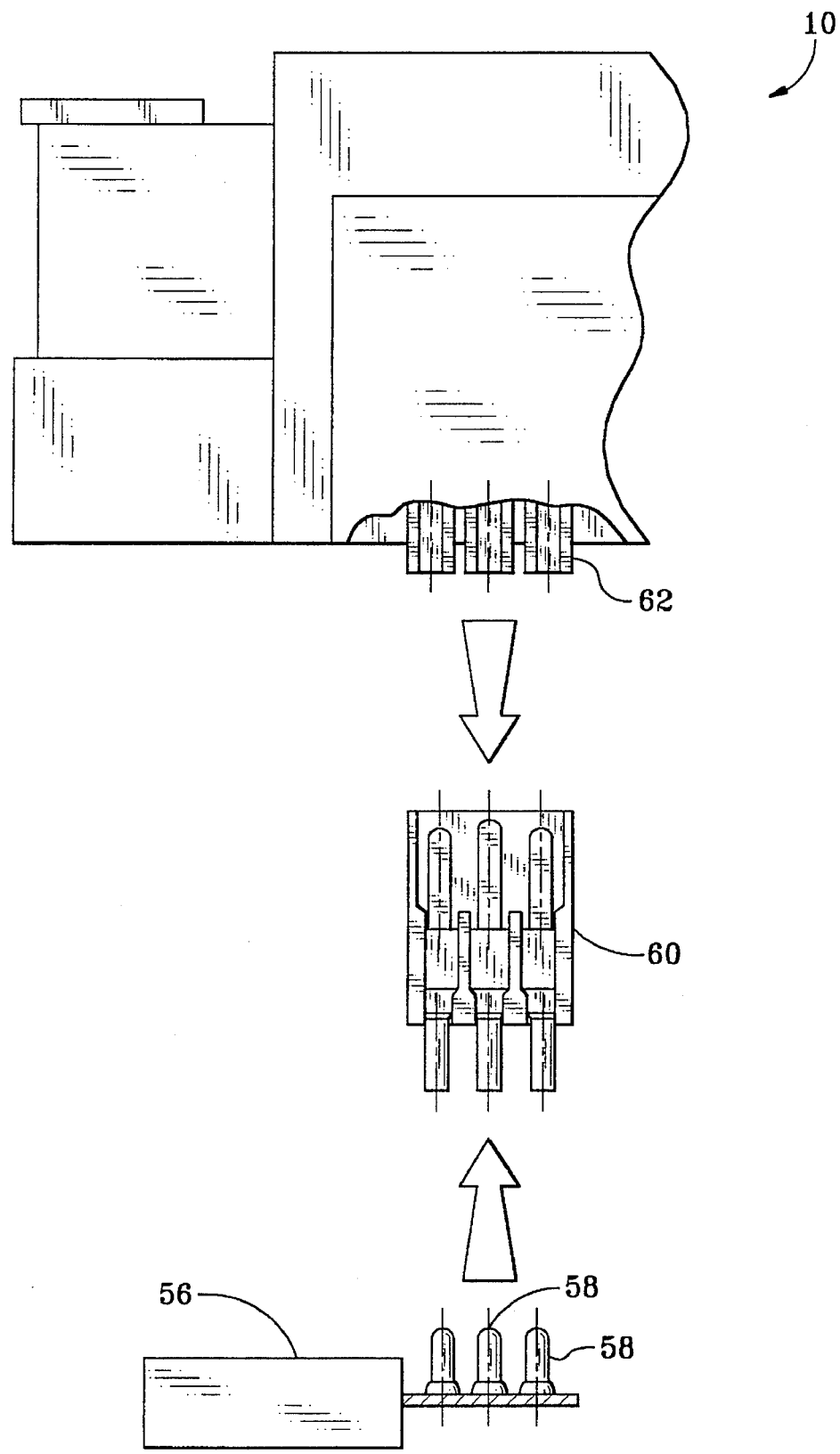
FIG. 2 is sectional view of how the functional units described in FIG. 1 may be assembled in accordance with the invention.

With reference to FIG. 2, there is shown a side, sectional view of how the functional units, described with reference to FIG. 1, may preferably be physically assembled within a valve unit. FIG. 2 shows a printed circuit board 56 having located thereon a plurality of plugs 58 designed to mate with an equivalent number of receptacles in a connector box 60 which, in turn, fits into a series of openings 62 contained within the valve unit 10. The electrical circuits previously described with reference to FIG. 1, in functional terms including the control circuit board 30, the isolator 34, and the driver and amp board 36, may be contained on a printed circuit board 56. Likewise, while a connector box 60 is shown as being interposed between the connectors 58 and receptacles 62 in valve unit 10, the connector block 60 may be eliminated entirely and the connectors 58 may be fitted directly into the receptacles 62.

Thus, it is easy to assemble a system comprising multiple electromagnetically actuable valves by plugging together of series of modular valve units 10 each of which has the required driver and control circuity to actuate a desired one or more of the valves contained in each valve unit.

While the invention has been particularly shown and described with reference to preferred embodiments thereof, it will be understood by those skilled in the art that the foregoing and other changes in form and detail may be made therein without departing from the spirit and scope of the invention as defined in the claims appended hereto.

What is claimed is:

1. In a system comprising multiple electromagnetically actuable valves arranged on a common fluid manifold, the valves being housed in discrete pluggable valve units, each unit including both a fluid circuit and an electrical circuit to supply actuating signals to the electromagnetically actuable valves in response to control signals, the improvement comprising:

a first electrical power supply to provide the actuating signals at a first voltage and a first current to the electromagnetically actuable valves in a first electrical circuit;

control means for providing control signals to actuate a selectable number of valves;

a second power supply for providing the control means with power at a second voltage and second current in a second electrical circuit;

isolation means for electrically isolating the first and second electrical circuits from one another;

amplifier means interposed between the first and second electrical circuits to amplify the control signals to a level required for the actuation signals.

2. Invention according to claim 1, wherein the control circuit board, isolation means and amplifier means are physically on a discrete pluggable board.

3. Invention according to claim 2 further including a connector block interposed between the discrete pluggable board and corresponding receptacle in the valve unit.

4. Invention according to claim 1, wherein the isolation means comprise an optocoupler.

5. Invention according to claim 1 in which the isolation means comprise a relay.

* * * * *